United States Patent
Pinnapareddy et al.

(10) Patent No.: US 11,034,892 B2
(45) Date of Patent: Jun. 15, 2021

(54) COMPOSITION AND METHOD FOR EXTRACTING, RECOVERING, OR REMOVING HYDROCARBON MATERIALS

(71) Applicant: EM Capital, LLC, Catoosa, OK (US)

(72) Inventors: Devender Pinnapareddy, Hyderabad (IN); Navin Chandra Mathur, Mumbai (IN); Sanjay D. Meshri, Tulsa, OK (US); Robert Adams, Owasso, OK (US)

(73) Assignee: EM Capital, LLC, Catoosa, OK (US)

( * ) Notice: Subject to any disclaimer, the term of this patent is extended or adjusted under 35 U.S.C. 154(b) by 228 days.

(21) Appl. No.: 16/102,845

(22) Filed: Aug. 14, 2018

(65) Prior Publication Data

US 2020/0056101 A1 Feb. 20, 2020

(51) Int. Cl.
*C10G 21/06* (2006.01)
*C10G 1/10* (2006.01)
*C09K 8/58* (2006.01)
*E21B 43/16* (2006.01)

(52) U.S. Cl.
CPC ............... *C10G 21/06* (2013.01); *C09K 8/58* (2013.01); *C10G 1/10* (2013.01); *E21B 43/16* (2013.01); *C10G 2300/1003* (2013.01); *C10G 2300/1007* (2013.01); *C10G 2300/1033* (2013.01)

(58) Field of Classification Search
CPC .......... C09K 17/14; C09K 17/40; C09K 3/22; C09K 8/62; C09K 8/68; C07C 7/00; C10G 1/045
See application file for complete search history.

(56) References Cited

U.S. PATENT DOCUMENTS

| | | |
|---|---|---|
| 2,261,700 A | 11/1941 | Ryznar |
| RE29,649 E | 5/1978 | Farnsworth |
| 5,082,584 A | 1/1992 | Loth et al. |
| 5,393,468 A | 2/1995 | Erilli et al. |
| 5,454,878 A | 10/1995 | Bala et al. |
| 5,679,628 A | 10/1997 | Simpson et al. |
| 6,093,689 A | 7/2000 | Vlasblom |
| RE36,982 E | 12/2000 | Melikyan et al. |
| 6,176,243 B1 | 1/2001 | Blunk |
| 6,566,410 B1 | 5/2003 | Zaki et al. |
| 6,630,428 B1 | 10/2003 | Furman et al. |
| 8,201,445 B2 | 6/2012 | Carbonell et al. |
| 2004/0208706 A1 | 10/2004 | Kukor et al. |
| 2010/0055198 A1 | 3/2010 | Wang et al. |
| 2010/0185039 A1 | 7/2010 | Hoag et al. |

(Continued)

FOREIGN PATENT DOCUMENTS

GB 2144763 3/1985

OTHER PUBLICATIONS

PCT International Search Report and Written Opinion; PCT/US2019/046092; dated Nov. 15, 2019; US.

(Continued)

*Primary Examiner* — Sharon Pregler
(74) *Attorney, Agent, or Firm* — Dennis D. Brown; Brown Patent Law, P.L.L.C.

(57) ABSTRACT

An environmentally friendly composition and method which increase the API gravity, increase the solubility, and reduce the viscosity of hydrocarbon materials to provide enhance extraction and removal of the hydrocarbon materials for purposes of recovery or cleaning.

20 Claims, 1 Drawing Sheet

(56) References Cited

U.S. PATENT DOCUMENTS

| | | |
|---|---|---|
| 2013/0281328 A1 | 10/2013 | Podella et al. |
| 2014/0260466 A1* | 9/2014 | Rehage .................. C05F 11/00 71/23 |
| 2014/0271928 A1 | 9/2014 | Rehage |
| 2014/0332212 A1 | 11/2014 | Ayers et al. |
| 2017/0106416 A1 | 4/2017 | Loureiro Pecoraro |

OTHER PUBLICATIONS

The Punch Line; Hy-Per Clean Concentrate; Website: http://formulacorp.com/hy-per-clean-concentrate; 2013; US.

Material Safety Data Sheet; PL Hy-Per Clean Conc 4X1 Case; Website: http://msds.formulacorp.com/pdf/msds_eng/pl%20hyper%clean%20conc.pdf; Feb. 11, 2009; US.

Katherine K. Stenerson and Michael D. Buchanan; DRO, EPH, ETPH, GRO, PRO, PVOC, STARS, TPH, VPH? Help, I'm Trapped in Alphabet Soup!; Website: https://wwsigmaldrich.com/technical-documents/articles/reporter-us/dro-eph-etph-gro.h . . . ; Reporter vol. 28.4; US.

\* cited by examiner

COMPOSITION AND METHOD FOR EXTRACTING, RECOVERING, OR REMOVING HYDROCARBON MATERIALS

FIELD OF THE INVENTION

The present invention relates to environmentally friendly compositions and methods for (a) extracting and recovering crude oil, petroleum fractions, and other hydrocarbon products from soils, refinery sludge materials, pipeline sludge materials, sludge materials from tanks and tankers, and other sludge materials, (b) removing hydrocarbon materials from parts, vessels, workshops and other facilities for cleaning purposes, (c) recovering hydrocarbon materials from shingles, asphalt and similar materials, and (d) restoring gas production rates in gas producing wells.

BACKGROUND OF THE INVENTION

Each year in the petroleum industry, large quantities of petroleum sludge materials are generated as a result of: (a) oilfield production processes and techniques, (b) the treatment of wastewater streams produced from desalting, distillation, thermal cracking, catalytic cracking, coking, and other petroleum refinery operations, and (c) the deposition and build-up of residues in pipelines, storage tanks, transport tankers, terminals, depots, oil-water separators, and processing vessels.

Petroleum sludge materials typically are complex emulsions which can comprise widely varying ratios of (i) crude oil, petroleum fractions or other hydrocarbon products, (ii) water, (iii) solid particulates, and (iv) heavy metals. Unfortunately, such sludge materials have proven to be very difficult to separate for purposes of recovering the potentially valuable petroleum materials contained therein and/or for cleaning.

In addition to petroleum sludge materials, large quantities of soil are contaminated each year with oil or other petroleum fractions or products as a result of spills and leaks from tankers, pipelines, trucks, railcars, refineries, storage tanks, oil field operations, etc.

The prior processes and techniques used in the industry for extracting and/or recovering hydrocarbon products from petroleum sludge and contaminated soil materials have been difficult, costly, and deficient in various respects. Heretofore, the use of such techniques for recovering petroleum products from sludge materials and contaminated soils having a low petroleum content have not been economically viable. Moreover, when used for recovering crude oil or other hydrocarbon materials or products from sludge materials or contaminated soils having a higher petroleum content, the procedures and techniques used in the art have generally not been effective for recovering all or most of the petroleum content of the material in a cost effective manner.

In addition, because the current recovery techniques used in the industry (a) are not commercially viable for use with sludges and contaminated soils having a lower petroleum content and (b) are only marginally effective for economic use with sludges and contaminated soils having a higher petroleum content, these techniques also are not effective for significantly reducing the cost and difficulty of subsequent procedures needed to fully remediate the sludge and soil materials.

Consequently, a need currently exists for an improved, environmentally friendly composition and method for extracting and recovering crude oil, petroleum fractions, and other hydrocarbon products from petroleum sludge materials and contaminated soils and for other recovery or cleaning purposes. The improved composition and method will preferably (a) be significantly simpler, more economical and more effective than prior compositions and techniques, (b) operate to extract and/or recover a significantly greater percentage of the petroleum material, (c) allow the cost effective recovery of crude oil and other petroleum products from sludge materials and contaminated soils having a lower petroleum content, and (d) remove a sufficient amount of the petroleum material from sludges or contaminated soils to significantly simplify and reduce the cost of additional procedures needed to fully remediate the sludge material or contaminated soil.

SUMMARY OF THE INVENTION

The present invention satisfies the needs and alleviates the problems discussed above. In one aspect, the present invention provides a composition for extracting, removing, and/or recovering hydrocarbon materials. In another aspect, the present invention provides a method in which the inventive composition is used from extracting and recovering hydrocarbon materials from petroleum sludge products or contaminated soils. In another aspect, the present invention provides a method in which the inventive composition is used for removing and/or recovering hydrocarbon materials from, or simply cleaning, shingles, asphalt, parts, workshops, other facilities, including those facilities whose main purpose is to replace used automotive oil and collect in reservoirs, etc. which contain, or are contaminated with, hydrocarbon materials or residues. In another aspect, the present invention provides a method in which the inventive composition is used to increase the production of gas from a gas producing well, particularly a low pressure well or a well which has lost pressure, by injecting the inventive composition into the well. In another aspect, the present invention provides a method in which the inventive composition is used to clean rail cars for sludge deposits.

The inventive composition desirably and unexpectedly operates to significantly increase the API gravity of substantially any crude oil, petroleum fraction, or other hydrocarbon material to which the inventive composition is applied. This surprising result further enhances the ability of the inventive composition to reduce the viscosity of, dissolve or partially dissolve, and extract hydrocarbon materials. Consequently, by way of example, the inventive composition and method can be used in a cost effective manner to recover hydrocarbon materials from sludge materials and soils having a low petroleum content and can also be used in a cost effective manner to recover a greater volume of the hydrocarbon materials contained in sludges and contaminated soils having a high petroleum content.

The inventive composition is also less toxic and environmentally friendly. In addition, the inventive composition can be used at ambient temperature without heating or pressurizing the sludge, soil, or other material being treated. The inventive composition also causes less etching than prior acidic or caustic formulations and thus increases the useful life of any components, containers, etc., on or in which the inventive composition is used.

The inventive composition comprises water and non-water components. The non-water components of the inventive composition preferably comprise: (a) a terpene solvent which is present in the composition in an amount of from 30% to 94% by volume based upon the total volume of the non-water components, the terpene solvent comprising at least one terpene compound; (b) an oxidizing agent selected from $H_2O_2$, carbamide peroxide, peracetic acid, or a combination thereof which is present in the composition in an amount of from 0.3% to 20% by volume based upon the total volume of the non-water components; (c) a first co-solvent selected from kerosene, gasoline, diesel, petroleum naphtha, or a combination thereof which is present in the composition in an amount of from 1% to 20% by volume based upon the total volume of the non-water components; (d) one or more second co-solvents selected from isopropyl alcohol, ethyl alcohol, methyl alcohol, one or more ethoxylated ethers, and/or one or more ethoxylated alcohols, the one or more second co-solvents being present in the composition in a total amount of from 3% to 60% by volume based upon the total volume of the non-water components; and (e) a solvent enhancing agent selected from magnesium sulfate, ethylene diamine tetra acetic acid, sodium persulfate, potassium persulfate, alum, or a combination thereof in an amount of from 1% to 20% by volume based upon the total volume of the non-water components.

In the method of the present invention in which the inventive composition is used to recover a hydrocarbon material from a sludge or contaminated soil, the method preferably comprises the steps of: (a) adding the composition to the sludge or contaminated soil; (b) allowing a layer of a fluid comprising the hydrocarbon material to separate from the sludge or contaminated soil; (c) removing the layer of the fluid from the sludge or contaminated soil; and (f) recovering the hydrocarbon material from the fluid.

In another aspect of the inventive method for recovering a hydrocarbon material from a sludge or contaminated soil, the inventive composition is preferably added to the sludge or contaminated soil in an amount effective to increase the API gravity of the hydrocarbon material contained in the sludge or soil by at least 2°.

In another aspect of the inventive method for recovering a hydrocarbon material from a sludge or contaminated soil, the method preferably also comprises the step, prior to adding the inventive composition to the sludge or contaminated soil, of adding dilution water to the inventive composition to form a diluted composition wherein the non-water components are present in the diluted composition in a total amount of from 6% to 45% by volume based upon the total volume of the diluted composition.

Further aspects, features, and advantages of the present invention will be apparent to those in the art upon examining the accompanying Figures and upon reading the following Detailed Description of the Preferred Embodiments.

DETAILED DESCRIPTION OF THE PREFERRED EMBODIMENTS

Figure 1:
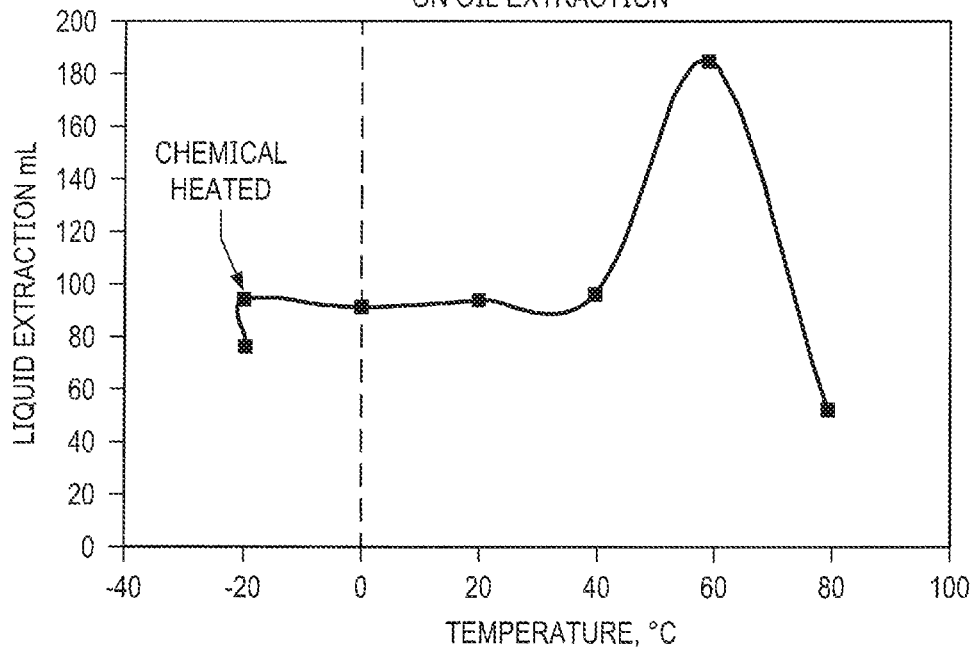
FIG. 1 is a plot of the test results provided below in Table 2 of Example 1 showing the effect of temperature on the oil extraction method of the present invention.

The composition provided by the present invention for extracting, removing and/or recovering hydrocarbon materials comprises water and a set of non-water components which preferably include: a terpene solvent; an oxidizing agent; a first co-solvent; one or more second co-solvents; and a solvent enhancing agent.

The terpene solvent used in the inventive composition is preferably present in the composition in an amount in the range of from 30% to 94% by volume, more preferably from 58% to 68% by volume, based upon the total volume of the non-water components of the composition. The terpene solvent is the primary solvent material used in the inventive composition. The terpene solvent operates as a solvent and a surfactant The terpene solvent used in the inventive composition is most preferably d-Limonene, Dipentene, or a combination thereof. d-Limonene a cyclic monoterpene which is a natural, renewable compound which is extracted from citrus peels discarded from juice production processes. Moreover, d-Limonene is substantially non-toxic and biodegradable, and blends well with the additional solvents used in the inventive composition.

The oxidizing agent used in the inventive composition is preferably present in the composition in an amount in the range of from 0.3% to 20% by volume, more preferably from 1% to 5% by volume, based upon the total volume of the non-water components of the composition. The oxidizing agent operates in the inventive composition to oxidize and thereby reduce the viscosity of the heavier (i.e., higher boiling point) hydrocarbon materials contained in the petroleum sludge or contaminated soil. Examples of suitable oxidizing agents include, but are not limited to, $H_2O_2$, carbamide peroxide, peracetic acid, and combinations thereof.

The oxidizing agent used in the inventive composition is most preferably hydrogen peroxide ($H_2O_2$). Hydrogen peroxide is very effective for oxidizing and reducing the viscosity of the heavier hydrocarbon materials in petroleum sludge materials or contaminated soils, and provides enhanced reactivity when used in the inventive composition in combination with d-Limonene.

When forming the inventive composition, the hydrogen peroxide or other oxidizing agent will preferably be added to the composition in the form of an aqueous solution of the oxidizing agent. The concentration of the oxidizing agent in the oxidizing agent solution will preferably be in the range of from 10% to 50% by volume, more preferably about 35% by volume, based upon the total volume of the solution, with the remainder of the solution being water. In regard to the component concentrations provided herein and in the claims, the water portion of the aqueous solution of the oxidizing agent is not characterized as a non-water component or as part of a non-water component. Rather, the water portion of the aqueous solution of the oxidizing agent is accounted for herein and in the claims as part of the total water content of the inventive composition.

The first co-solvent used in the inventive composition is preferably present in the composition in an amount in the range of from 1% to 20% by volume, more preferably from 3% to 10% by volume, based upon the total volume of the non-water components of the composition. The first co-solvent operates in the inventive composition as a solvent, a degreaser, and a lubricant. The first co-solvent is preferably kerosene, gasoline, diesel, petroleum naphtha, or a combination thereof. The first co-solvent used in the inventive composition is most preferably kerosene.

The one or more second co-solvents used in the inventive composition is/are preferably present in the composition in an amount in the range of from 3% to 60% by volume, more preferably from 10% to 30% by volume, based upon the total volume of the non-water components of the composition. The one or more second co-solvents operate in the inventive composition to dissolve the smaller and/or polar hydrocarbon materials in the petroleum sludge or contaminated soil and can also provide antifreeze protection for cold weather use.

The one or more second co-solvents are preferably selected from isopropyl alcohol, ethyl alcohol, methyl alcohol, one or more ethoxylated ethers, one or more ethoxylated alcohols, or a combination thereof.

The one or more second co-solvents preferably comprise: (a) isopropyl alcohol in an amount of from 1% to 20% by volume, more preferably from 3% to 10% by volume, based upon the total volume of the non-water components; (b) ethyl alcohol in amount of from 1% to 20% by volume, more preferably from 3% to 10% by volume, based upon the total volume of the non-water components; and (c) methyl alcohol in an amount of from 1% to 20% by volume, more preferably from 3% to 10% by volume, based upon the total volume of non-water components of the inventive composition.

The solvent enhancing agent used in the inventive composition is preferably present in the composition in an amount in the range of from 1% to 20% by volume, more preferably from 3% to 10% by volume, based upon the total volume of the non-water components of the composition. The solvent enhancing agent operates in the inventive composition to enhance to extraction and grease removal of the terpene solvent and other solvent components of the inventive composition. The solvent enhancing agent is preferably selected from magnesium sulfate, ethylene diamine tetra acetic acid, sodium persulfate, potassium persulfate, alum, or a combination thereof. The solvent enhancing agent used in the inventive composition is most preferably magnesium sulfate (Epsom Salt).

The inventive composition is preferably initially prepared by a procedure comprising the steps of: (a) adding the solvent enhancing agent to an amount of water which will be in the range of from 6% to 37% by volume of a total volume of the composition as initially formed, and mixing the composition such that the solvent enhancing agent is preferably completely dissolved; (b) then adding the oxidizing agent (in aqueous solution form) and adding the first co-solvent while mixing the composition; (c) then adding the one or more second co-solvents while mixing the composition; and (d) then adding the terpene solvent while mixing the composition.

More preferably, when the second co-solvents are isopropyl alcohol, ethyl alcohol, and methyl alcohol, the inventive composition, in its initial form, will be prepared by: (a) adding the solvent enhancing agent to an amount of water which will be in the range of from 6% to 37% by volume of a total volume of the composition as initially formed, and mixing the composition such that the solvent enhancing agent is preferably completely dissolved; (b) then adding the oxidizing agent (in aqueous solution form) while mixing the composition; (c) then adding the first co-solvent while mixing the composition; (d) then adding the isopropyl alcohol while mixing the composition; (e) then adding the ethyl alcohol while mixing the composition; (f) then adding the methyl alcohol while mixing the composition; and (g) then adding the terpene solvent while mixing the composition.

In its completed initial form, the inventive composition will be an emulsion but will separate into an organic layer and an inorganic layer if not used immediately. However, the composition can be readily returned to its emulsion form by stirring or otherwise mixing the composition prior to use.

Thus, as prepared in its preferred initial form, e.g., for storage or transport to a sludge or soil treatment site for use, the total water content of the inventive composition will preferably be in the range of from 10% to 40% by volume based upon the total volume of the composition. Consequently, as initially prepared, all of the non-water components of the inventive composition will preferably be present in an amount in the range of from 60% to 90% by volume based upon the total volume of the composition. The water used in the inventive composition will preferably be de-ionized water and/or distilled water and will preferably be de-ionized water. In addition to facilitating the formation and use of the inventive composition, the water contained in the inventive composition also reduces the flash point and flammability of the composition.

In the method of the present invention for extracting and recovering hydrocarbon materials from a petroleum sludge material or contaminated soil, the sludge material or soil will preferably be collected in a suitable containing structure or formation (e.g., a tank, pit, lagoon, or other vessel or formation) for treatment with the inventive composition for extraction and recovery of the hydrocarbon materials from the soil or sludge.

Prior to adding the inventive composition to the petroleum sludge material or contaminated soil, the inventive composition, which is preferably produced at or transported to the treatment site in its initial form as discussed above, will preferably be further diluted by adding dilution water to the initial composition to form a diluted composition. The diluted composition will preferably comprise (a) from about 5% to about 50% by volume of the inventive composition as initially formed and (b) from about 50% to about 95% by volume of the added dilution water. Consequently, following the addition of the dilution water in accordance with these concentration ranges, the total concentration in the diluted composition of all of the non-water components of the inventive composition will be in the range of from about 3% to about 45% by volume based on the total volume of the diluted composition.

Following the dilution of the inventive composition, the diluted composition will preferably be added to a petroleum sludge material or contaminated soil containing a light crude oil or petroleum fraction in an amount effective to increase the API gravity of the light hydrocarbon material in the sludge or soil by at least 2°. For a petroleum sludge material or contaminated solid containing a heavy crude oil or petroleum fraction, the diluted composition will preferably be added in an amount effective to increase the API gravity of the heaving hydrocarbon material by at least 10°. Typically, depending upon the concentration of the inventive diluted composition, the temperature of the sludge or soil, the temperature of the diluted composition, the API gravity and viscosity of the hydrocarbon material prior to treatment, or other factors, one part by volume of the diluted inventive composition will can be added to, and will be used to extract crude oil or petroleum fractions contained in, from about 1.5 pbv to about 10.0 pbv of sludge material or contaminated soil.

After the inventive diluted composition is thoroughly mixed with the sludge material or contaminated soil, the sludge material or soil is preferably allowed to set for a period of at least from about 8 to about 72 hours. During this time, the inventive composition operates to (a) break down long chain hydrocarbons and otherwise increase the API gravity of the hydrocarbon material contained in the sludge or soil, (b) reduce the viscosity of the hydrocarbon material, (c) dissolve at least a portion of the hydrocarbon material, and (d) extract the hydrocarbon material as or as part of a fluid layer which forms on top of the sludge or soil.

Next, the fluid layer which forms on top of the sludge material or contaminated soil is preferably separated from the sludge or soil and recovered. Further treatment of the fluid layer by distillation or other methods known in the art can also be used to further separate or purify the recovered hydrocarbon material.

As mentioned above, in accordance with the present invention, the inventive composition is used for: (a) extracting and recovering hydrocarbon materials from shingles or asphalt; (b) cleaning parts, containers, workshops, other facilities, etc. which are contaminated with hydrocarbon materials or residues; (c) increasing the production of gas from a gas producing well, particularly a low pressure well or a well which has lost pressure, by injecting the inventive composition into the well; and (d) rail car cleaning of sludge deposits.

The inventive composition is effective for cleaning hard and resilient surfaces and the bleaching action of the composition is safe and effective on grouted ceramic tile at a dilution of 1 part by volume of the inventive composition in its initial form per 20 parts by volume dilution water. When used for removing tar, wax or rust, the inventive composition will preferably be used in its initial form without the addition of dilution water. When used for cleaning tiles, concrete, or marine vessels, or for adhesive removal, the inventive composition will preferably be used in a diluted form comprising 1 part by volume of the inventive composition in its initial form per 20 parts by volume dilution water.

The following examples are meant to illustrate, but in no way limit, the claimed invention.

EXAMPLES

Three oil sludge mixtures were prepared to simulate an oil spill at a well or pipeline site. The compositions of the simulated sludges were as follows: (1) local farm soil from Grand Forks, N. Dak. plus Bakken light crude oil with 2 cP oil viscosity; (2) local farm soil from Grand Forks, N. Dak. plus Canada heavy oil with 1000 cP oil viscosity; and (3) local farm soil from Grand Forks, N. Dak. plus regular cement, a cement retarding agent, and Bakken light crude oil with 2 cP oil viscosity. The crude oil from the Bakken Formation in the North Dakota portion of the Williston basin had an API gravity of 42°. The crude oil from Canada had an API gravity of 14°.

Each of the simulated sludges was treated with the composition provided by the present invention in order to extract and recover the hydrocarbon materials contained in the simulated sludges. The non-water components and component concentrations of the specific composition used are listed in Table 1.

TABLE 1

| Composition | Percentage, % Vol. |
| --- | --- |
| Hydrogen Peroxide (expressed as $H_2O_2$ only) | 12.5 |
| Epsom Salt | 6.25 |
| Kerosene | 6.25 |
| Alcohol | 6.25 |
| Ethanol | 6.25 |
| Methanol | 6.25 |
| D-Lim (Orange) | 56.25 |

It was observed that the oil in each case was initially extracted by the inventive composition very quickly (minutes), and then stabilized hours later. The time required for the system to stabilize depended to some extent on the concentration, amount and temperature of the inventive composition used.

Example 1

Six treatment temperatures from −20 to 80° C. were tested for simulated sludges containing Bakken oil. The test period was 24 hours. In the 20° C. tests, the proportion, by volume, of the inventive composition used to the soil and crude oil components of the sludge was 1:1:3.5 (inventive composition:farm soil:crude oil) and 1:0.47:1.84. The inventive composition was diluted to a concentration of 50% (50% of inventive composition+50% Distilled water). The laboratory results are shown in Table 2 and in FIG. 1.

Based on the laboratory test results, it was observed that: (1) the inventive solution promoted oil extraction at all temperatures within a few minutes and stabilized within 24 hours, (2) for a diluted concentration of 50%, the peak value of the oil extraction from the oil sludge mixture occurred at 60° C., and (3) at negative temperatures which simulated cold winter conditions, heating the chemical solution from 20 to 60° C. (Case 7 in Table 2) and applying to the sludge was more effective than the case (case 6) where the chemical solution was not heated in advance.

TABLE 2

Effect of temperature on oil extraction

| Case | Oil sludge ingredient | Proportion (chemical/soil/oil) | Duration Hour | Temperature, ° c. | Chemical concentration, % | Liquid produced amount, mL |
| --- | --- | --- | --- | --- | --- | --- |
| 1 | Bakken oil + farm soil | 1:1:3.5 | 24 | 20 | 50 | 94 |
| 2 | Bakken oil + farm soil | 1:1:3.5 | 24 | 40 | 50 | 95.5 |
| 3 | Bakken oil + farm soil | 1:1:3.5 | 24 | 60 | 50 | 82.5 |
| 4 | Bakken oil + farm soil | 1:1:3.5 | 24 | 80 | 50 | 50 |
| 5 | Bakken oil + farm soil | 1:1:3.5 | 24 | 0 | 50 | 92 |
| 6 | Bakken oil + farm soil | 1:0.47:0.84 | 24 | −20 | 50 | 78 |
| 7 | Bakken oil + farm soil | 1:1:3.5 | 24 | −20 | 50 | 96 |

Example 2

Figure 2:
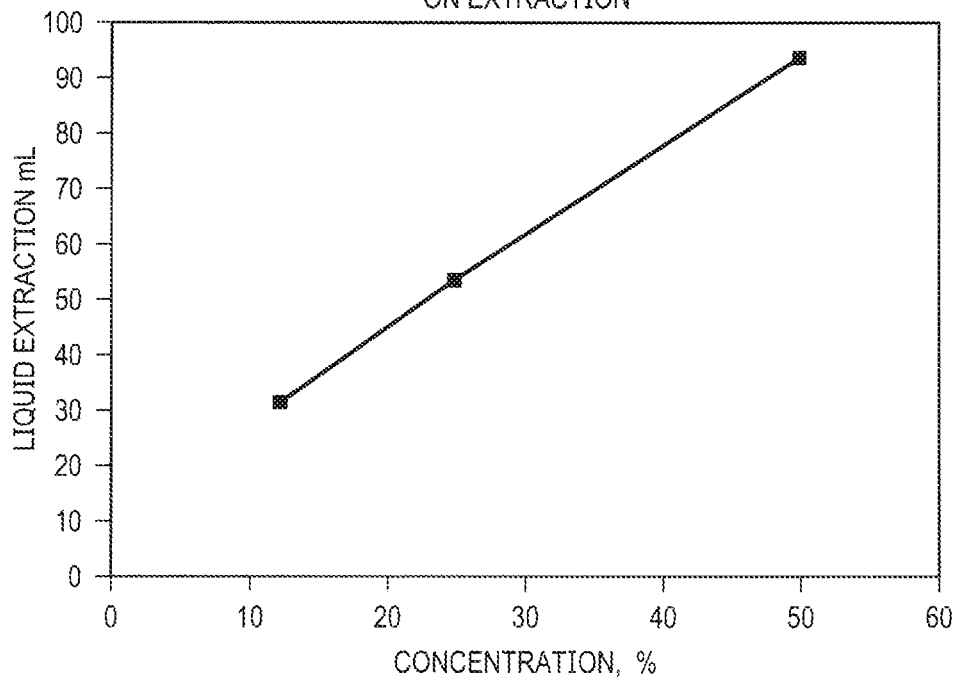
FIG. 2 is a plot of the test results provided below in Table 3 of Example 2 showing the effect of the concentration of the inventive composition on the inventive oil extraction method.

Three highly diluted concentrations (12.50%) of the inventive composition were tested to simulate a spill of Bakken oil in farm soil. The test period was 24 hours. The proportion of diluted treatment composition to the soil and crude components of the simulated oil sludge was 1:1:3.5 at 20° C. Results are shown in Table 3 and FIG. 2. Based upon the laboratory results, it was observed that: (1) the inventive composition promoted oil extraction at all concentrations, (2) at lower chemical concentration, it took more time to stabilize the suspended solids in the liquid mixture, and (3) as the chemical concentration decreased, the volume of extracted liquid also decreased.

TABLE 3

Effect of chemical concentration on oil extraction

| Case | Oil sludge ingredient | Proportion (chemical/soil/oil) | Duration Hour | Temperature, ° c. | Chemical concentration, % | Liquid produced amount, mL |
|---|---|---|---|---|---|---|
| 1 | Bakken oil + farm soil | 1:1:3.5 | 24 | 20 | 12.5 | 31 |
| 2 | Bakken oil + farm soil | 1:1:3.5 | 36 | 40 | 25 | 53 |
| 3 | Bakken oil + farm soil | 1:1:3.5 | 72 | 60 | 50 | 94 |

Example 3

Two types of oil were tested in a simulated oil sludge made from farm soil found in the Grand Forks (a) a light crude oil from the Bakken and (2) a heavy crude oil from Canada. The test period was 24 hours. The volumetric proportion of diluted chemical composition to the soil and oil components of the simulated sludge was 1:1:3.5 at 20° C. The inventive composition was diluted to 50%. The test results are shown in Table 4. Based on these results, it was observed that: (1) the inventive composition promoted oil extraction over a wide range of oil types and (2) as the oil viscosity increased, the amount of extracted liquid decreased only slightly.

For Examples 1-4 presented above, the composition of the oil was determined before and after the treatment of each of the simulated sludge materials. GRO and DRO analyses were performed on (1) light crude oil (Bakken) before and after treatment at 20° C. and 60° C. and (2) heavy crude oil (Canada) before and after treatment at 20° C.

The original light gravity (42 API, 2 ep)) Bakken crude oil contained a broad spectrum of hydrocarbons, mostly in the $C_{10}$-$C_{28}$ range, with some light end BTEX compounds also present. After treatment with the inventive formulation at 20° C., the oil extract lost most of the original components of the crude which were $C_{13}$ or higher but the concentration of components in the $C_8$-$C_{12}$ range increased. The BTEX analysis indicated a significant reduction in mass of light

TABLE 4

Effect of oil type on oil extraction

| Case | Oil type | Oil viscosity cP | Proportion (chemical/soil/oil) | Duration Hour | Temperature ° c. | Chemical concentration % | Liquid extracted amount, mL |
|---|---|---|---|---|---|---|---|
| 1 | Bakken oil + farm soil | 2 | 1:1:3.5 | 24 | 20 | 50 | 94 |
| 2 | Canada oil+ | 1000 | 1:1:3.5 | 24 | 40 | 50 | 90 |

Example 4

Two types of oil sludge were tested by treatment with the inventive composition. One simulated oil sludge was made from (a) farm soil having a high clay content and (b) light crude oil from the Bakken. The other oil sludge was made with the same farm soil, regular cement, a cement retarding agent, and a portion of tap water. The test period was 24 hours. The volumetric proportion of inventive composition used to the oil sludge (soil+oil) was 1:1:3.5 at 20° C. The diluted concentration of the inventive composition was 50%. Test results are shown in Table 5. Based upon these results, it was observed that: (1) the inventive composition promoted oil extraction over a wide range of oil sludge types and (2) for the second case in Table 5, more liquid was produced possibly due to more water being extracted out from the mixture that had the cement retarding agent.

volatiles. Similar patterns in GRO and DRO compounds were seen for treatments at 60° C. Overall, regardless of the temperature of the test, the inventive composition was effective for cleaving or breaking down longer chain alkanes into shorter chains. The API gravity was also increased to 45.7°.

The original heavy, viscous Canadian crude oil (14 API, 1000 cp) had a low, broad hump across its entire DRO spectrum, which was very different from the Bakken crude. After treatment with the inventive composition, the API gravity of the oil extract from the Canadian crude oil increased from 14° to 28°, indicating that a similar type of breakdown process occurred with the heavy Canadian crude as with the Bakken samples.

In summary, the tests described herein showed that: (a) the inventive composition was effective for extracting and recovering oil from sludge; (b) the primary factors that

TABLE 5

Effect of oil sludge compostion on oil extraction

| Case | Oil sludge ingredient | Proportion (chemical/soil/oil) | Duration Hour | Temperature ° C. | Chemical concentration % | Liquid extracted amount, mL |
|---|---|---|---|---|---|---|
| 1 | Bakken oil + farm soil | 1:1:3.5 | 24 | 20 | 50 | 94 |
| 2 | Bakken oil + farm soil + cement + cement retarding agent | 1:1:3.5 | 24 | 40 | 50 | 141 | influenced the effectiveness of the oil extraction process were time and the concentration of the inventive composition; (c) temperature, oil type, and sludge composition had less effect on the oil extraction process; and (d) the inventive composition and process increase the API gravity of the hydrocarbon material, apparently by breaking down long chain hydrocarbons into shorter hydrocarbons.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed:

1. A composition for extracting, removing, and/or recovering hydrocarbon materials, the composition comprising non-water components and water and the non-water components comprising:
   a terpene solvent which is present in the composition in an amount of from 30% to 94% by volume based upon a total volume of the non-water components, the terpene solvent comprising at least one terpene compound;
   an oxidizing agent selected from $H_2O_2$, carbamide peroxide, peracetic acid, or a combination thereof which is present in the composition in an amount of from 3% to 20% by volume based upon the total volume of the non-water components;
   a first co-solvent selected from kerosene, gasoline, diesel, petroleum naphtha, or a combination thereof which is present in the composition in an amount of from 1% to 20% by volume based upon the total volume of the non-water components;
   one or more second co-solvents selected from isopropyl alcohol, ethyl alcohol, methyl alcohol, one or more ethoxylated ethers, and/or one or more ethoxylated alcohols, the one or more second co-solvents being present in the composition in a total amount of from 3% to 60% by volume based upon the total volume of the non-water components; and
   a solvent enhancing agent selected from magnesium sulfate, ethylene diamine tetra acetic acid, sodium persulfate, potassium persulfate, alum, or a combination thereof in an amount of from 1% to 20% by volume based upon the total volume of the non-water components.

2. The composition of claim 1 wherein the terpene solvent is d-Limonene, Dipentene, or a combination thereof.

3. The composition of claim 2 wherein the oxidizing agent is $H_2O_2$.

4. The composition of claim 2 wherein the first co-solvent is kerosene.

5. The composition of claim 2 wherein the one or more second co-solvents comprise:
   isopropyl alcohol in an amount of from 1% to 20% by volume based upon the total volume of the non-water components;
   ethyl alcohol in amount of from 1% to 20% by volume based upon the total volume of the non-water components; and
   methyl alcohol in an amount of from 1% to 20% by volume based upon the total volume of the non-water components.

6. The composition of claim 1 wherein:
   the water is present in the composition in a total amount of from 10% to 40% by volume based upon a total volume of the composition and
   the non-water components are present in the composition in a total amount of from 60% to 90% by volume based upon the total volume of the composition.

7. The composition of claim 6 wherein the water is de-ionized water.

8. The composition of claim 1 wherein the composition is formed by a procedure for forming the composition which comprises:
   i) adding the solvent enhancing agent to an amount of the water which is from 6% to 37% by volume of a total volume of the composition and mixing such that the solvent enhancing agent is dissolved,
   ii) then adding the oxidizing agent and the first co-solvent with mixing,
   iii) then adding the one or more second co-solvents with mixing, and
   iv) then adding the terpene solvent with mixing.

9. The composition of claim 8 wherein the oxidizing agent is added as an aqueous dilution of the oxidizing agent comprising from 10% to 50% of the oxidizing agent and from 50% to 90% water by volume.

10. The composition of claim 9 wherein the procedure for forming the composition further comprises the step, following step (iv), of adding dilution water to form a diluted composition such that, after the dilution water is added, the non-water components are present in the diluted composition in a total amount of from 3% to 45% by volume based upon a total volume of the diluted composition.

11. The composition of claim 1 wherein:
   the composition further comprises a sludge or a contaminated soil to which the non-water components and the water are added,
   the sludge or the contaminated soil comprises a hydrocarbon material, and
   the non-water components are present in the composition in a total amount effective to increase an API gravity of the hydrocarbon material in the composition by at least 2°.

12. The composition of claim 11 wherein the terpene solvent is d-Limonene, Dipentene, or a combination thereof.

13. The composition of claim 11 wherein
   the non-water components and the water are present in the composition in a total amount of 1 part by volume (pbv) and
   the sludge or the contaminated soil is present in the composition in an amount in a range of from 1.5 pbv to 10 pbv.

14. The composition of claim 11 wherein the total amount of the non-water components present in the composition is an amount effective to increase the API gravity of the hydrocarbon material in the composition by at least 10°.

15. The composition of claim 11 wherein the total amount of the non-water components present in the composition is from 3% to 45% by volume of a total volume of the non-water components and the water.

16. A composition comprising:
   a sludge or a contaminated soil which comprises a hydrocarbon material;
   water;
   a terpene solvent comprising at least one terpene compound;
   an oxidizing agent selected from $H_2O_2$, carbamide peroxide, peracetic acid, or a combination thereof;

a first co-solvent selected from kerosene, gasoline, diesel, petroleum naphtha, or a combination thereof;
one or more second co-solvents selected from isopropyl alcohol, ethyl alcohol, methyl alcohol, one or more ethoxylated ethers, and/or one or more ethoxylated alcohols; and
a solvent enhancing agent selected from magnesium sulfate, ethylene diamine tetra acetic acid, sodium persulfate, potassium persulfate, alum, a combination thereof,
wherein the oxidizing agent is present in the composition in an amount effective to increase an API gravity of the hydrocarbon material of the sludge or the contaminated soil by at least 2°.

17. The composition of claim 16 wherein the oxidizing agent is present in the composition in an amount effective to increase the API gravity of the hydrocarbon material of the sludge or the contaminated soil by at least 10°.

18. The composition of claim 16 wherein the oxidizing agent is $H_2O_2$.

19. The composition of claim 16 wherein the water, the terpene solvent, the oxidizing agent, the first co-solvent, the one or more second co-solvents, and the solvent enhancing agent are present in the composition in a total amount of 1 pbv and the sludge or the contaminated soil is present in the composition in an amount in a range of from 1.5 pbv to 10 pbv.

20. The composition of claim 16 wherein the terpene solvent is d-Limonene, Dipentene, or a combination thereof.

* * * * *